(12) United States Patent
Jangra et al.

(10) Patent No.: US 9,338,057 B2
(45) Date of Patent: May 10, 2016

(54) TECHNIQUES FOR SEARCHING DATA ASSOCIATED WITH DEVICES IN A HETEROGENEOUS DATA CENTER

(71) Applicant: NetApp, Inc., Sunnyvale, CA (US)

(72) Inventors: Sandeep Jangra, San Diego, CA (US); Ran Gilboa, Cambridge, MA (US); Ophir Horn, Newton, MA (US)

(73) Assignee: NETAPP, INC., Sunnyvale, CA (US)

( * ) Notice: Subject to any disclaimer, the term of this patent is extended or adjusted under 35 U.S.C. 154(b) by 199 days.

(21) Appl. No.: 14/066,932

(22) Filed: Oct. 30, 2013

(65) Prior Publication Data

US 2015/0120747 A1    Apr. 30, 2015

(51) Int. Cl.
| | |
|---|---|
| *G06F 17/30* | (2006.01) |
| *H04L 12/24* | (2006.01) |
| *G06F 11/30* | (2006.01) |
| *G06F 11/34* | (2006.01) |

(52) U.S. Cl.
CPC .......... *H04L 41/085* (2013.01); *G06F 11/3006* (2013.01); *G06F 11/3051* (2013.01); *G06F 11/3438* (2013.01)

(58) Field of Classification Search
CPC ............... G06F 17/30613; G06F 17/30643; G06F 17/30663; G06F 17/30696; G06F 17/30707; G06F 17/30719; G06F 17/30914; G06F 17/3053; G06F 17/30584; G06F 17/30952; G06F 3/067; G06F 3/065; G06F 3/0604; G06F 3/0619; G06F 3/0689; G06F 3/0688; G06F 11/2094; G06F 3/0665; G06F 11/3452; G06F 17/30097; G06F 1/263; H04L 63/08; H04L 63/0892; H04L 63/104; H04L 12/14; H04L 12/22; H04L 29/06047; H04L 29/06068; G06Q 30/04; G06Q 30/0603
USPC ......... 707/741, 748, 749, 750, 751, 768, 769, 707/770, 821, 688, E17.01, E17.002, 707/E17.005, E17.014, E17.11; 711/147, 711/114, E12.016, E12.006, E12.001, 711/E12.002; 709/238, 225, 224; 455/556.1
See application file for complete search history.

(56) References Cited

U.S. PATENT DOCUMENTS

| | | | | |
|---|---|---|---|---|
| 6,868,396 | B2 * | 3/2005 | Smith et al. | .................. 705/26.9 |
| 8,620,925 | B1 * | 12/2013 | Grube et al. | .................. 707/741 |
| 8,959,287 | B1 * | 2/2015 | Shajenko, Jr. | .......... G06F 12/08 711/119 |

(Continued)

OTHER PUBLICATIONS

Minghong Lin et al.—"Online Algorithms for Geographical Load Balancing"—Published in: Green Computing Conference (IGCC), 2012 International Date of Conference: Jun. 4-8, 2012, Sans Jose, CA—pp. 1-10.*

(Continued)

*Primary Examiner* — Anh Ly
(74) *Attorney, Agent, or Firm* — Klein, O'Neill & Singh, LLP (57) ABSTRACT

Examples are disclosed for searching data associated with devices in a heterogeneous data center. In some examples, data may be gathered for a database. The data may be associated with a heterogeneous data center having devices from multiple vendors. The database may be indexed to link data for a given device to an attribute, association or usage context for the given device. Responsive to a search request, data for a given device from among the devices in the heterogeneous data center may be provided based on a comparison of the search request to the indexed database. Other examples are described and claimed.

20 Claims, 7 Drawing Sheets

(56) References Cited

U.S. PATENT DOCUMENTS

| | | | | |
|---|---|---|---|---|
| 8,997,091 | B1* | 3/2015 | Watson et al. | 717/175 |
| 9,081,594 | B1* | 7/2015 | Labonte | G06F 9/44521 711/119 |
| 9,218,035 | B2* | 12/2015 | Li | G06F 1/263 713/300 |
| 2002/0087505 | A1* | 7/2002 | Smith et al. | 707/1 |
| 2002/0116372 | A1* | 8/2002 | Ladouceur et al. | 707/3 |
| 2002/0116376 | A1* | 8/2002 | Iwata et al. | 707/3 |
| 2003/0097422 | A1* | 5/2003 | Richards | G06F 8/61 709/217 |
| 2003/0115199 | A1* | 6/2003 | Ochiai | G06F 17/30554 707/741 |
| 2004/0066782 | A1* | 4/2004 | Nassar | H04L 12/2856 370/389 |
| 2004/0139224 | A1* | 7/2004 | Nishimura et al. | 709/238 |
| 2004/0172466 | A1* | 9/2004 | Douglas | H04L 12/2602 709/224 |
| 2005/0027610 | A1* | 2/2005 | Wharton | 705/26 |
| 2005/0027611 | A1* | 2/2005 | Wharton | 705/26 |
| 2005/0149940 | A1* | 7/2005 | Calinescu | G06F 9/5061 718/104 |
| 2005/0268070 | A1* | 12/2005 | Baxter | 711/203 |
| 2006/0080429 | A1* | 4/2006 | Motoyama | H04L 12/2602 709/224 |
| 2006/0129415 | A1* | 6/2006 | Thukral | G06Q 10/087 705/28 |
| 2007/0011398 | A1* | 1/2007 | Van Niekerk | G06F 13/28 711/111 |
| 2007/0073863 | A1* | 3/2007 | Motoyama | G03G 15/5075 709/224 |
| 2007/0239944 | A1* | 10/2007 | Rupanagunta et al. | 711/147 |
| 2008/0010287 | A1* | 1/2008 | Hinton | G06F 17/30545 707/E17.032 |
| 2008/0082866 | A1* | 4/2008 | Li | 714/43 |
| 2008/0275864 | A1* | 11/2008 | Kim et al. | 707/E17.014 |
| 2009/0228506 | A1* | 9/2009 | Wada | G06F 17/30286 707/741 |
| 2009/0254971 | A1* | 10/2009 | Herz | G06Q 10/10 705/1.1 |
| 2010/0034119 | A1* | 2/2010 | Van Steen et al. | 370/254 |
| 2010/0107172 | A1* | 4/2010 | Calinescu | G06F 9/5061 718/104 |
| 2010/0312615 | A1* | 12/2010 | Murphy et al. | 705/14.11 |
| 2010/0332453 | A1* | 12/2010 | Prahlad | G06F 11/1458 707/640 |
| 2011/0022812 | A1* | 1/2011 | van der Linden | G06F 9/5077 711/163 |
| 2011/0055219 | A1* | 3/2011 | Yamamoto | G06F 17/30289 707/741 |
| 2011/0060887 | A1* | 3/2011 | Thatcher | G06F 3/0604 711/171 |
| 2011/0082997 | A1* | 4/2011 | Yochai et al. | 711/171 |
| 2011/0179405 | A1* | 7/2011 | Dicks et al. | 717/168 |
| 2011/0296133 | A1* | 12/2011 | Flynn | G06F 11/1048 711/171 |
| 2012/0011340 | A1* | 1/2012 | Flynn et al. | 711/171 |
| 2012/0110647 | A1* | 5/2012 | Guo et al. | 726/4 |
| 2012/0271472 | A1* | 10/2012 | Brunner | G06F 1/3209 700/295 |
| 2013/0055340 | A1* | 2/2013 | Kanai | G06F 21/53 726/1 |
| 2013/0191477 | A1* | 7/2013 | You | H04L 51/00 709/206 |
| 2013/0198506 | A1* | 8/2013 | Smith | G06F 1/1684 713/100 |
| 2013/0212410 | A1* | 8/2013 | Li | G06F 1/263 713/300 |
| 2014/0283100 | A1* | 9/2014 | Harrison | G06F 21/6245 726/26 |

OTHER PUBLICATIONS

Shaolei Ren—"Energy-Efficient Design of Real-Time Stream Mining Systems"—Published in: Acoustics, Speech and Signal Processing (ICASSP), 2013 IEEE International Conference on Date of Conference: May 26-31, 2013, Vancouver, BC pp. 3592-3596.*

* cited by examiner

Index 200

| Device | Attribute | Association | Usage Context | Data |
|---|---|---|---|---|
| 110-1 | IP Address, Name, Identifier | VMs 112-1 to 112-n | Host | Database Pointer 1 |
| VM 112-1 | IP Address, Name, Identifier | 110-1 | Host | Database Pointer 2 |
| VM 112-2 | IP Address, Name, Identifier | 110-1 | Host | Database Pointer 3 |
| VM 112-n | IP Address, Name, Identifier | 110-1 | Host | Database Pointer 4 |
| 110-2 | IP Address, Name, Identifier | 110-m | Storage | Database Pointer 5 |
| 110-m | IP Address, Name, Identifier | 110-2 | Storage | Database Pointer 6 |

Database 132

| Pointer | Physical / Logical Address | Data Gathered |
|---|---|---|
| 1 | 001 | Configuration/Parameter 1 |
| 1 | 002 | Configuration/Parameter 2 |
| 1 | 003 | Configuration/Parameter 3 |
| 2 | 004 | Configuration/Parameter 1 |
| 3 | 005 | Configuration/Parameter 1 |
| 4 | 006 | Configuration/Parameter 1 |
| 5 | 007 | Configuration/Parameter 1 |
| 5 | 008 | Configuration/Parameter 2 |
| 6 | 009 | Configuration/Parameter 1 |
| 6 | 010 | Configuration/Parameter 2 |

GATHER, BY A PROCESSOR CIRCUIT, DATA FOR A DATABASE, THE DATA ASSOCIATED WITH A HETEROGENEOUS DATA CENTER HAVING DEVICES FROM MULTIPLE VENDORS
*602*

INDEX THE DATABASE TO LINK DATA FOR A FIRST DEVICE FROM AMONG THE DEVICES TO AN ATTRIBUTE OF THE FIRST DEVICE, AN ASSOCIATION OF THE FIRST DEVICE WITH ANOTHER DEVICE FROM AMONG THE DEVICES OR A USAGE CONTEXT FOR THE FIRST DEVICE
*604*

RECEIVE A SEARCH REQUEST
*606*

PROVIDE, RESPONSIVE TO THE SEARCH REQUEST, DATA FOR THE FIRST DEVICE FROM THE DATABASE BASED ON A COMPARISON OF THE SEARCH REQUEST TO THE INDEXED DATABASE
*608*

TECHNIQUES FOR SEARCHING DATA ASSOCIATED WITH DEVICES IN A HETEROGENEOUS DATA CENTER

BACKGROUND

Data centers are increasing in size in terms of the number and variety of devices. Devices such as storage servers and/or hosting servers may be deployed in large numbers in these growing data centers. Heterogeneous data centers having devices manufactured or created by a number of different vendors or manufacturers are becoming more common. The growing number and diversity of vendors for devices in heterogeneous data centers may result in a need for a large amount of data to be gathered to manage at least some devices in these heterogeneous data centers.

DETAILED DESCRIPTION

As contemplated in the present disclosure, a large amount of data may be gathered to manage at least some devices in heterogeneous data centers having devices from multiple vendors. The gathering of data may be complicated by different nomenclatures or naming schemes used by different vendors even if the devices are deployed in a same usage context. For example, host servers may be identified by certain vendors as merely as a "host". Other vendors may have vender-specific names that are not as general as the term "host". This may add complexity to gathering data and may be problematic to an administrator efficiently managing devices in a heterogeneous data center.

According to some examples, techniques for searching data associated with devices in a heterogeneous data center may be implemented. These techniques may include gathering data for a database. For these examples, the data may be associated with a heterogeneous data center having devices from multiple vendors. The database may be indexed to link data for a first device from among the devices to an attribute of the first device, an association of the first device with another device from among the devices or a usage context for the first device. Responsive to receiving a search request, data may be provided for the first device from the database based on a comparison of the search request to the indexed database. For example, an attribute of the first device may be indicated in the search request and the attribute may index to data in the database associated with managing or controlling the first device.

Figure 1:
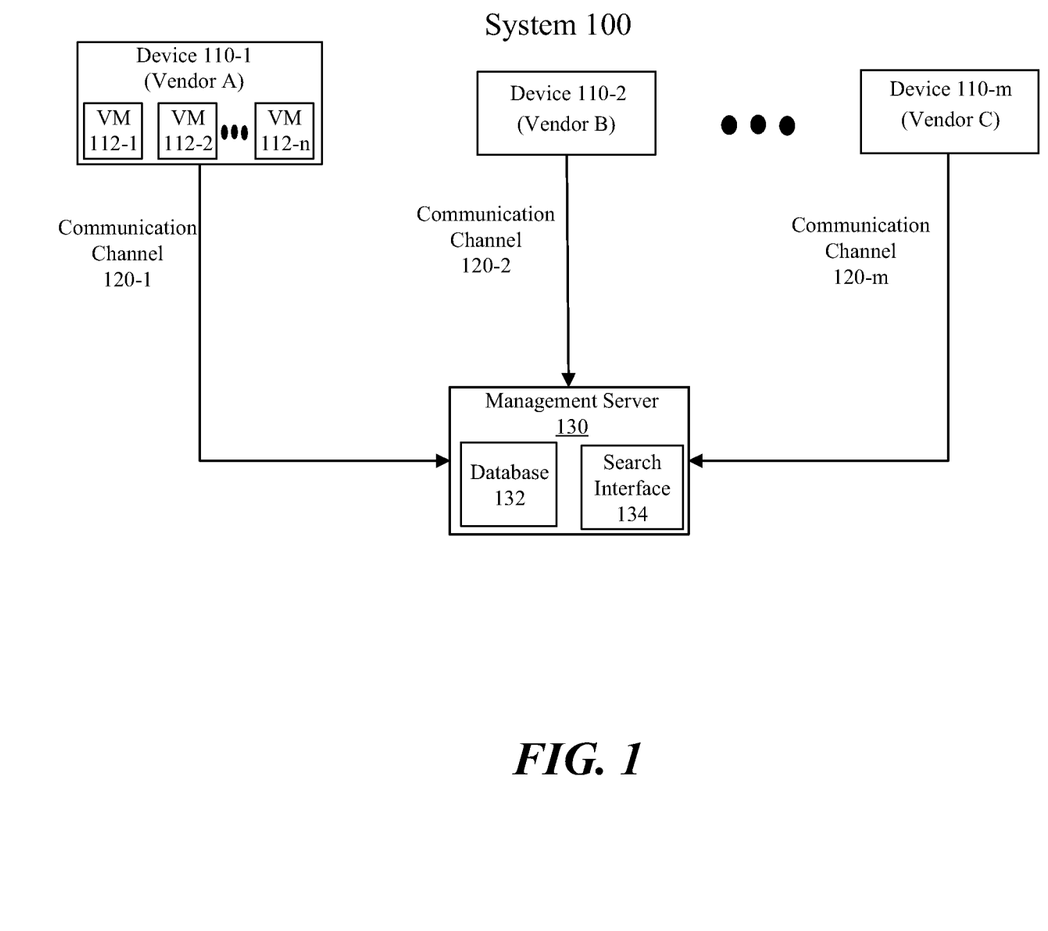
FIG. 1 illustrates an example first system.

FIG. 1 illustrates an example system 100. As shown in FIG. 1, system 100 includes devices 110-1, 111-2 and device 110-m, where "m" equals any positive whole integer greater than 2. Devices 110-1 to 110-m are also shown in FIG. 1 as coupling to a management server 130 via communication channels 120-1 to 120-m, respectively. Communication channels 120-1 to 120-m may include one or more wired or wireless communication links that may communicatively couple management server 130 to devices 110-1 to 110-m. In some examples, these communication channels may be arranged to operate according to any number of wireless or wired communication protocols such as those associated with wireless/wired local access networks, wireless/wired wide access networks or the Internet.

According to some examples, system 100 may be arranged as a data center and management server 130 may be capable of managing or controlling devices 110-1 to 110-m. As shown in FIG. 1, devices 110-1, 110-2 and 110-m may be from vendors A, B and C, respectively. As a result of having devices from multiple vendors, system 100 may be referred to as a heterogeneous data center.

In some examples, devices 110-1 to 110-m may include various types of devices deployed in a heterogeneous data center environment to provide storage or computing resources. Devices 110-1 to 110-m may include, but are not limited to, storage devices, storage servers, host devices, host servers, web hosting servers, cloud computing devices or cloud computing servers.

According to some examples, devices 110-1 to 110-m may be deployed in one or more usage contexts or environments. For example, device 110-2 or device 110-m may be storage devices or servers arranged to operate in a storage usage context. The storage usage context may include storing or retrieving data to/from one or more storage units (e.g., solid state drives or hard disk drives) located at or with device 110-2 o device 110-m. Device 110-1 may be deployed in a host usage context. For examples, as shown in FIG. 1, device 110-1 may be capable of providing computing resources or hosting a plurality of logical entities or virtual machines (VMs) 112-1, 112-2 to 112-n, where "n" equals any positive whole integer greater than 2. In other examples, rather than hosting VMs, device 1110—may host other compute intensive services directly such as web hosting.

In some examples, as shown in FIG. 1, management server 130 includes a database 132 and a search interface 134. As described in more detail below, logic and/or features executed by circuitry located at or with management server 130 may gather data for database 132 from devices 110-1, 110-2 or 110-m. The data gathered for database 132 may include relevant data to enable an administrator for system 100 to manage or control devices 110-1, 110-2 or 110-m. The logic and/or features may be capable of indexing database 132 to link data for each device from among devices 110-1 to 110-m to an attribute, association or usage context for the given device. The administrator for system 100 may cause a search request to be entered to search interface 134 and the logic and/or features may provide data for the given device based on a comparison of the search request to indexed database 132. The administrator may then use the provided data to manage or control, for example, operating parameters for the given device or other devices from among devices 110-1 to 110-m.

Figure 2:
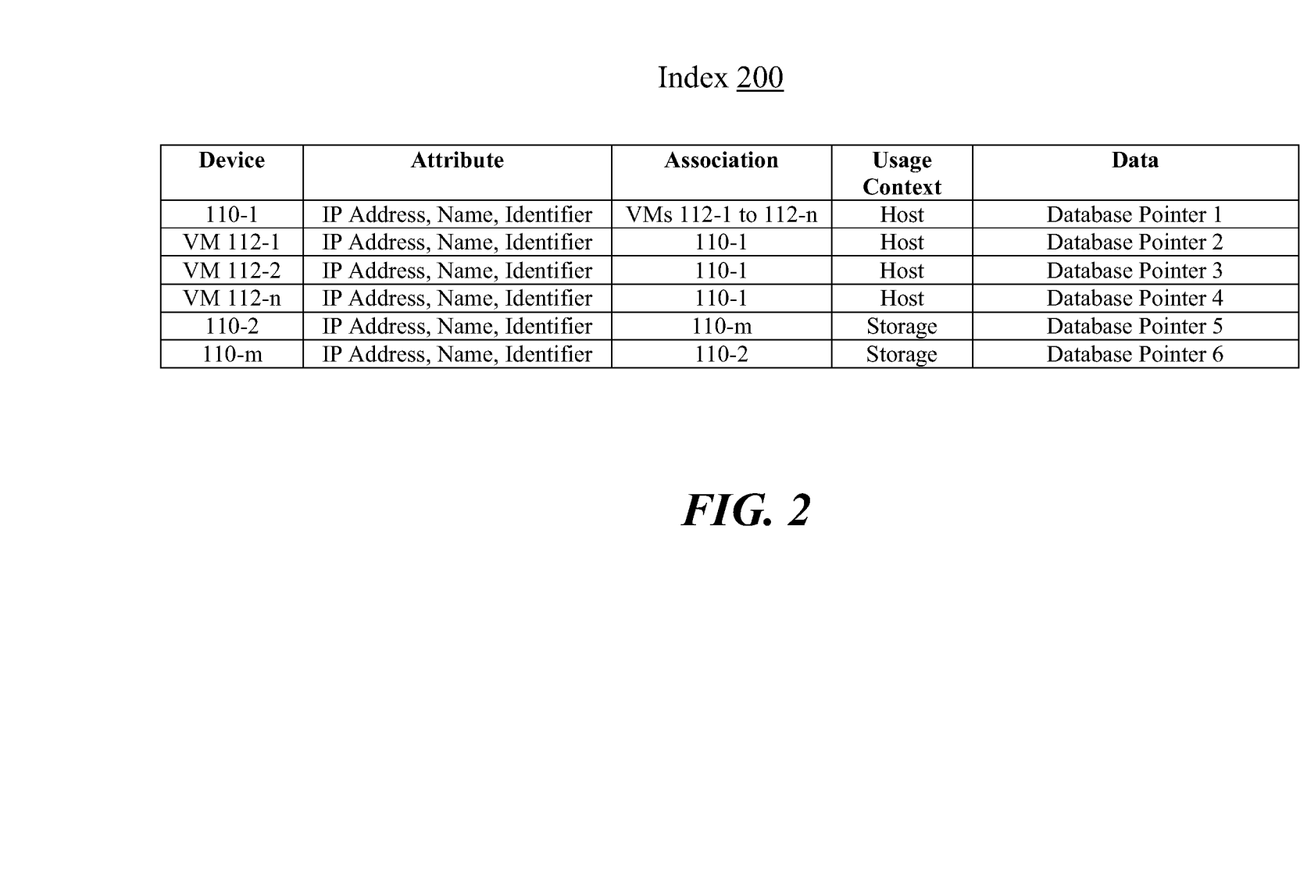
FIG. 2 illustrates an example index.

FIG. 2 illustrates an example index 200. As shown in FIG. 2, index 200 includes device, attribute, association, usage context and data information. According to some examples, index 200 may have been generated by logic and/or features at a management server 130 to link data for devices 110-1 to 110-m to an attribute, association or usage context. The data linked, for example, may have been gathered from devices 110-1 to 110-m. As described more below, the data may be selectively gathered for database 132 based on one or more criteria that may be associated with or indicated in search requests of a search requestor of database 132.

According to some examples, an attribute may include a network address such as an internet protocol (IP) address. An attribute may also include a name such as a common name used for the type of device (e.g., "host") or the name may be a more vendor specific name. An attribute may also include an identifier that may uniquely identify a given device such as a globally or universally unique identifier.

In some examples, an association may associate a given device with another device or with a logical entity such as a virtual machine. As shown in FIG. 2, device 110-1 may have an association with VMs 112-1 to 112--n and these VMs may then have an association with device 110-1. Also, in some examples, devices 110-2 and 110-m may be associated with each other (e.g., based on usage context).

According to some examples, usage context may indicate what usage context the device has been deployed or is operating under. For example, device 110-1 as well as VMs 112-1 to 112--n may have a host usage context. Devices 110-2 and 110-m may have a storage usage context.

In some examples, a database pointer or other locator scheme (e.g., physical or logical address range) may be implemented to link data gathered for a given device to the device. For these examples, responsive to a search request, logic and/or features at management server 130 may compare contents or search terms possibly included in the search request to an attribute, association or usage context. For example, if a search request indicates an attribute that matches attributes for device 110-1, VMs 112-1 to 112--n, device 110-2 or device 110-m then the applicable pointer for that device/VM may be used to obtain linked data from database 132 and provide that linked data for the applicable device/VM. Also, if the applicable device/VM has an association with another device/VM, the database pointer for that other device/VM may also be used to provide linked data for the other device/VM. In other examples, if the search request indicates a particular usage context, than database pointer(s) for devices/VMs that match the particular usage context may be used to provide linked data for those devices/VMs having the particular usage context.

The columns included in index 200 to indicate possible index information to link data for devices are just some examples of possible linking information that may be used to provide data responsive to a search request. Other characteristics, traits, usage contexts or other types of information associated with a device or VM may be used to index a database of gathered data for devices of a heterogeneous data center. Examples are not limited to the just the attributes, association and usage context information shown in FIG. 2 for index 200.

Figure 3:
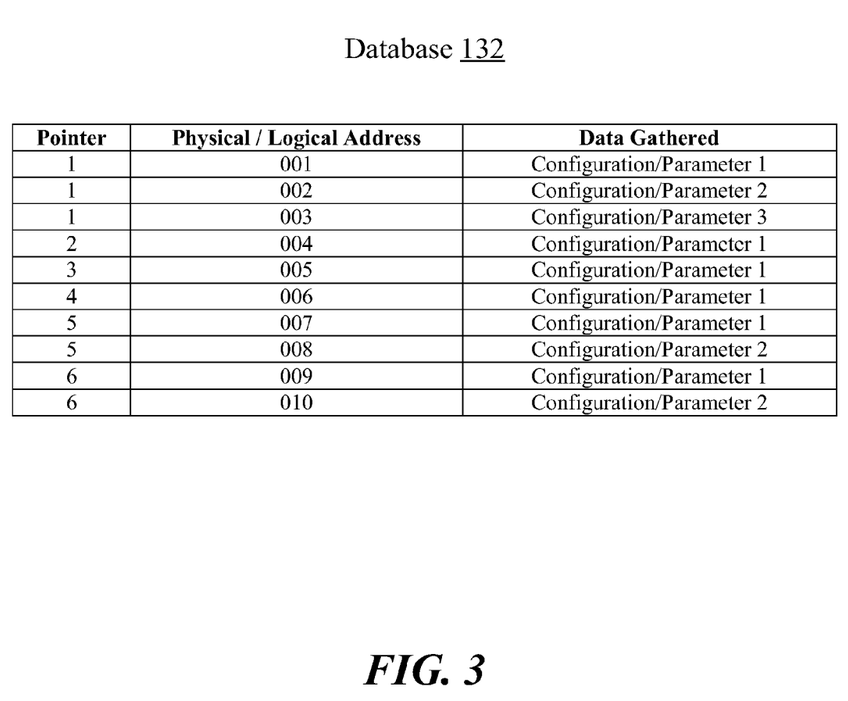
FIG. 3 illustrates an example database.

FIG. 3 illustrates example database 132. In some examples, as shown in FIG. 3, database 132 may include pointers to physical/logical addresses that may maintain data gathered for devices/VMs in system 100. For these examples, the pointers depicted for database 132 may correspond to the pointers indicated in index 200 for FIG. 2. Logic and/or features at management server 130 may be capable of utilizing these pointers to obtain data from the indicated physical/logical address. These physical/logical addresses may be associated with one or more storage devices located at management server 130 and/or accessible to the logic and/or features at management server 130.

According to some examples, given physical/logical addresses may store configuration/parameter information as part of the data gathered for devices/VMs in system 100. For example, pointer 1 may point to data gathered and maintained in physical/logic addresses 001, 002 and 003. As mentioned above for index 200, pointer 1 may index to device 110-1 and the data gathered for this example may include configuration/parameter information for device 110-1.

In some examples, configuration/parameter information may include configuration information such as a vendor identifier, device/VM identifier, network address, common/generic name, vendor-specific name or device/VM capabilities. Device/VM capabilities may include, but are not limited to, number/type of processors, memory, operating system(s), storage, ability to support VMs, storage and/or network protocols supported, etc. Configuration/parameter information may also include, but is not limited to, operating parameters such as available memory, available storage, processing work load/activity, VMs supported, cooling capabilities, power utilization, operating temperatures, network latencies, memory/storage access latencies, intrusion detection, etc.

According to some examples, as shown in FIG. 3, pointer 1 may point to a total of three physical/logical addresses 001, 002 and 003 holding respective configuration/parameters 1, 2 and 3. As shown in FIG. 2, pointer 1 had been indexed to device 110-1. For these examples, a relatively higher number of configuration/parameters may have been gathered for device 110-1 due to device 110-1 being deployed in a host usage context that may include hosting VMs 112-1 to 112--n. An administrator for system 100 may desire to gather more data for device 110-1 in order to better manage or control a device that may host any number of VMs. Also, pointers 2-4 for VMs 112-1 to 112--n may have only a single or low number of configuration/parameters gathered due to the administrators needing to control or manage relatively less configuration/parameters for logical entities such as VMs 112-1 to 112-n.

In some examples, as shown in FIG. 3, pointers 5 and 6 may each point to two physical/logical addresses 007/008 and 009/0010, respectively. As shown in FIG. 2, pointers 5 and 6 were indexed to devices 110-2 and 110-m . For these examples, devices 110-2 and 110-m may have both been deployed in a storage usage context and the administrator of system 100 may not need as many configuration/parameters to control or manage. Although in other examples, more configuration/parameters may be gathered if the administrator has a higher interest in managing or controlling device 110-2 to 110-m deployed in a storage usage context compared to device 110-1 or VMs 112-1 to 112-m deployed in a host usage context.

Database 132 as shown in FIG. 3 provides an example of how a pointer included in index 200 may be used to obtain data from a database having gathered data. The number of physical/logical addresses and configuration/parameters shown in FIG. 3 depict one of many possible examples of how data may be gathered for a database such as database 132. Examples are not limited in this context.

Figure 4:
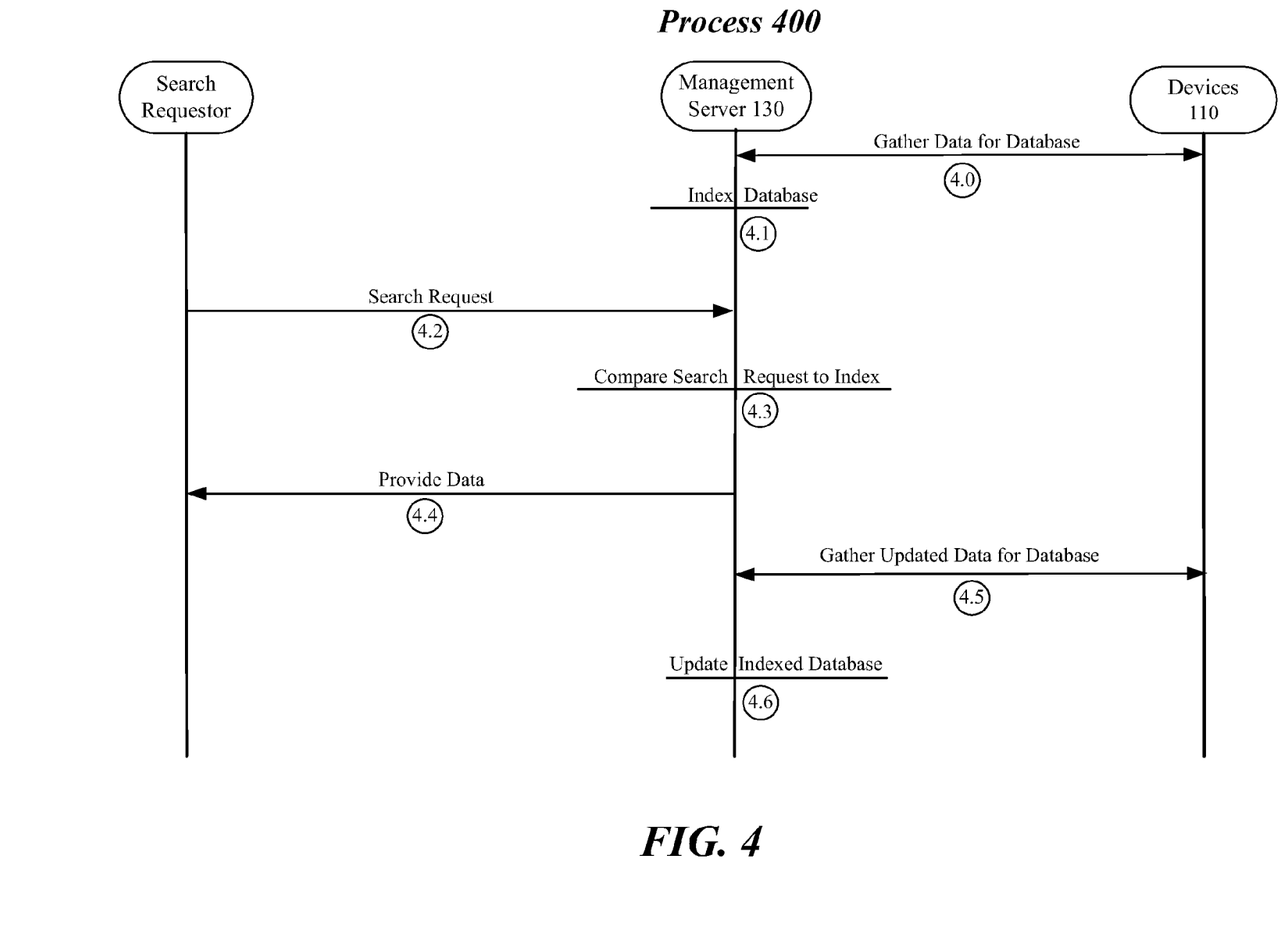
FIG. 4 illustrates an example process.

FIG. 4 illustrates example process 400. In some examples, process 400 may be for providing data responsive to a search request. For these examples, elements of system 100 as shown in FIG. 1, index 200 as shown in FIG. 2 or database 132 as shown in FIG. 3 may be used to illustrate example operations related to process 400. However, the example processes or operations are not limited to implementations using elements of system 100, to index 200 or to database 132.

Beginning at process 4.0 (Gather Data for Database), logic and/or features at management server 130 may gather data for database such as database 132. In some examples, the data may be associated with devices 110-1 to 110-m or VMs 112-1 to 112--n of system 100. The data may be gathered based on various criteria to include, but not limited to a geographical location of system 100 and/or devices 110-1 to 110-m , a network domain or domains associated with system 100, usage-specific gathering criteria or a usage pattern associated with previous search request that may have been placed to obtain data for devices 110-1 to 110-m.

In some examples, data may be gathered based on geographical location if that geographical location typically involves location specific data. For example, a certain geographical location may be in a relatively hot climate where operating temperatures for devices 110-1 to 110-m may be of high importance to an administrator. Also data related to a status of cooling systems may be relevant. In other examples, the geographical location may be a remote data center where security issues due to the remote location and possible low staffing levels may raise the importance of intrusion detection systems associated with rooms or server racks/cabinets housing devices.

In some examples, data may also be gathered based on a network domain or domains if the network domain has certain identifiable needs. For examples, the network domain may be assigned to a financial management company that may have certain needs associated with managing finances and maintaining a high level of data reliability and integrity. Data may be gathered from devices 110-1 to 110-m or other components of system 100 to meet these needs.

According to some examples, data may also be gathered based on user-specific gathering criteria. For these examples, a user may pre-define what data is to be gathered from devices 110-1 to 110-m or other components of system 100. Data may then be gathered from devices 110-1 to 110-m based, at least in part, on pre-defined, use-specific gathering criteria.

In some examples, data may also be gathered based on usage patterns associated with previous search requests. For example, search requests may be tracked at least for a given period of time to establish a usage pattern. The usage pattern may indicate the data that is most commonly requested and also data that is rarely or never requested. Data gathering may be adjusted/modified based on the established usage pattern.

Proceeding to process 4.1 (Index Database), logic and/or features at management server 130 may index database 132. In some examples, the index of database 132 may be similar to example index 200 and may link gathered data to an attribute, an association or a usage context.

Proceeding to process 4.2 (Search Request), logic and/or features at management server 130 may receive a search request. According to some examples, a search requestor may cause the search request to be sent to management server 130. The search request may indicate an attribute for a device from among devices 110-1 to 110-m (e.g., an IP address). The search request may indicate the other device or VM via which the device may have been associated with when database 132 was indexed. The search request may indicate a usage context indexed to the device.

Proceeding to process 4.3 (Compare Search Request to Index), logic and/or features at management server 130 may compare the search request to index 200. In some examples, a database pointer for database 132 may be determined based on the comparison. For example, a host usage context may be indicated in the search request. Index 200 shows that device 110-1 and VMs 112-1 to 112--n are linked to a host usage context and database pointers 1 to 4 may point to data in database 132 gathered for device 110-1 and VMs 112-1 to 112-n.

Proceeding to process 4.4 (Provide Data), logic and/or features at management server 130 may provide data for the linked device(s) to the search requestor. As mentioned in the example above, database pointers 1 to 4 may point to data in database 132. Data maintained or stored at database pointer 1 to 4 may then be provided to the search requestor.

Proceeding to process 4.5 (Gather Updated Data for Database), logic and/or features at management server 130 may be capable of periodically gathering updated data from devices or logical entities (e.g., VMs) of system 100.

Proceeding to process 4.6 (Update Indexed Database), logic and/or features at management server 130 may update indexed database 132. According to some examples, additional devices may be added to system 100 and data for these additional devices may be added to database 132. Index 200 may then be updated to include these additional devices as well as linking information and a database pointer to the gathered data. The process may then return to process 4.2 for a new search request or may return to process 4.5 if a periodic update time period has elapsed.

Figure 5:
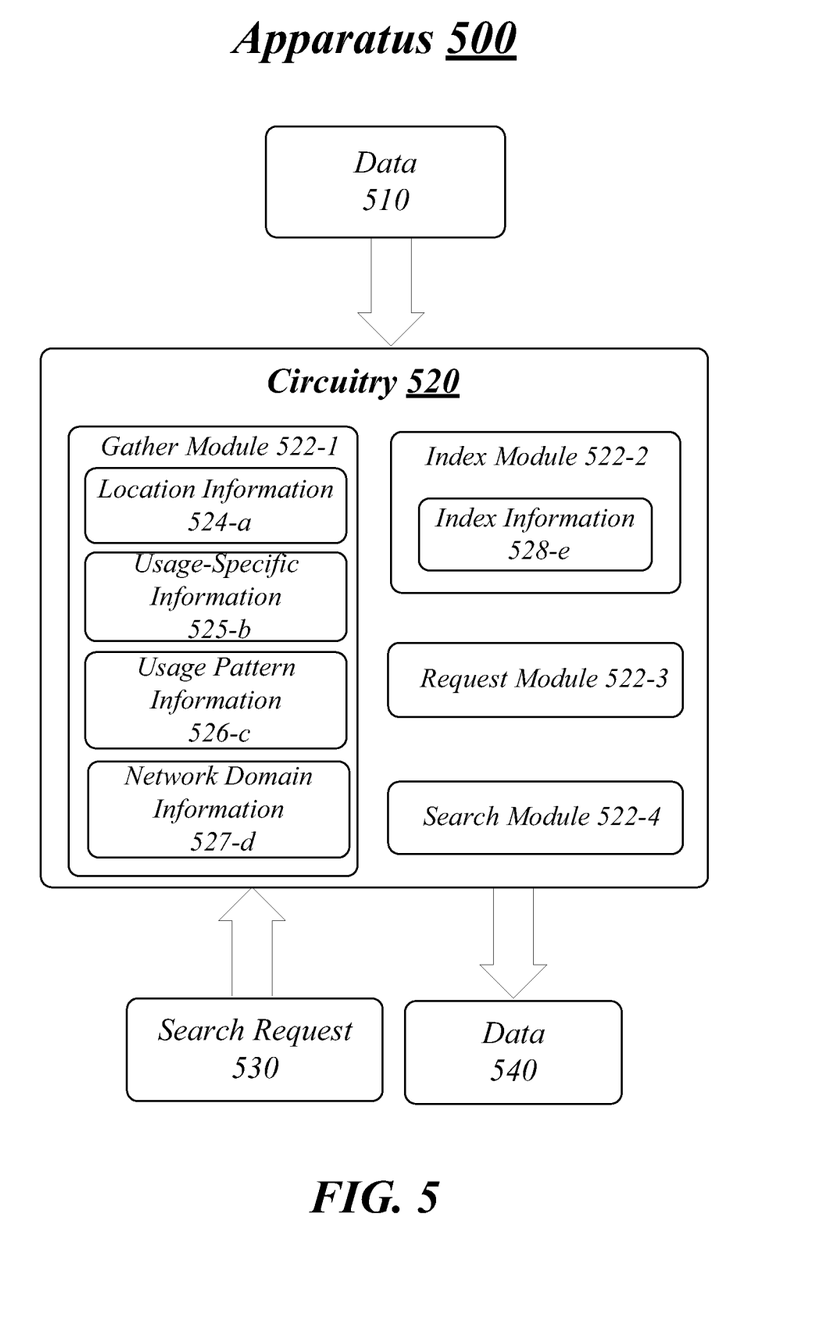
FIG. 5 illustrates an example apparatus.

FIG. 5 illustrates an example apparatus 500. Although the apparatus 500 shown in FIG. 5 has a limited number of elements in a certain topology, it may be appreciated that the apparatus 500 may include more or less elements in alternate topologies as desired for a given implementation.

The apparatus 500 may comprise a computer-implemented apparatus that may encompass at least some of the capabilities mentioned above for the logic and/or features located at or with management server 130 for FIG. 1. The computer-implemented apparatus 500 may be arranged to execute one or more software modules 522-a. It is worthy to note that "a" and "b" and "c" and similar designators as used herein are intended to be variables representing any positive integer. Thus, for example, if an implementation sets a value for a=4, then a complete set of software modules 522-a may include modules 522-1, 522-2, 522-3 or 522-4. The examples are not limited in this context.

In some examples, as shown in FIG. 5, apparatus 500 includes circuitry 520. Circuitry 520 may be generally arranged to execute one or more modules 522-a. Circuitry 520 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 520. According to some examples circuitry 520 may also include an application specific integrated circuit (ASIC) and modules 522-a may be implemented as firmware by hardware elements of the ASIC.

According to some examples, apparatus 500 may include a gather module 522-1. Gather module 522-1 may be executed by circuitry 520 to gather data for a database. The gathered data may be associated with a heterogeneous data center having devices from multiple vendors. For these examples, the gathered data may be included in data 510 and may be gathered based on information maintained by gather module 522-1 in location information 524-a, usage-specific information 525-b, usage pattern information 526-c or network domain information 527-d. Gather module 522-1 may maintain this information in one or more data structures to include, but not limited to, a lookup table (LUT).

In some examples, apparatus 500 may also include an index module 522-2. Index module 522-2 may be executed by circuitry 520 to index the database to link data for a first device from among the devices in the heterogeneous data center to an attribute of the first device, an association of the first device with another device from among the device or a usage context for the first device. Index module 522-2 may be capable of maintaining the index (e.g., similar to index 200) with index information 528-3 (e.g., in a LUT).

In some examples, apparatus 500 may also include a request module 522-3. Request module 522-3 may be executed by circuitry 520 to receive a search request. For these examples, the search request may be included in search request 530. The search request included in search request 530, for example, may be received by request module 522-3 through an input/output device directly or remotely coupled to a management server that includes apparatus 500.

According to some examples, apparatus 500 may also include a search module 522-4. Search module 522-4 may be executed by circuitry 520 to provide data for the first device from the database responsive to the search request based on a comparison of the search request to the indexed database. For these examples, the data may be provided in data 540 to a search requestor that caused or generated the search request. Data 540 may be provided based on the comparison leading to a database pointer to where data may be obtained by search module 522-4 from the indexed database and then provided to the search requestor.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
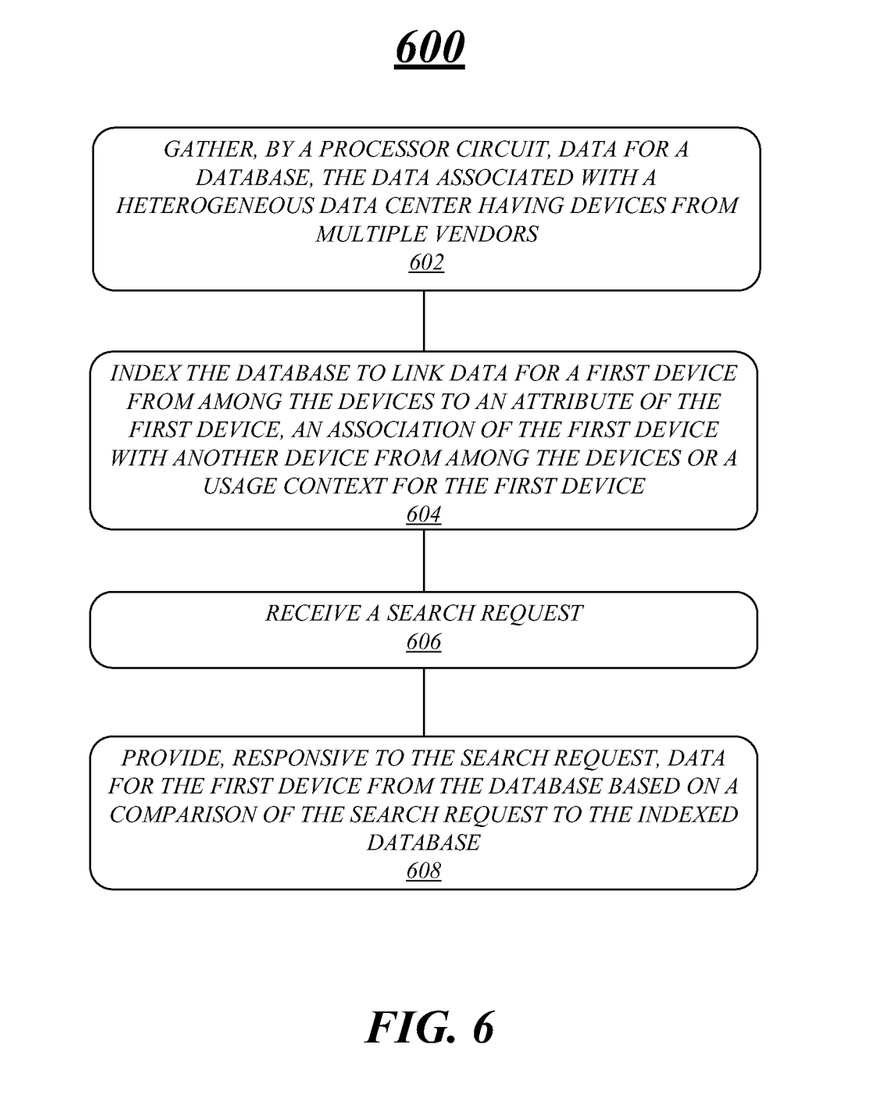
FIG. 6 illustrates an example logic flow.

FIG. 6 illustrates a logic flow 600. Logic flow 600 may be representative of some or all of the operations executed by one or more logic, features, or devices described herein, such as apparatus 600. More particularly, logic flow 600 may be implemented by gather module 522-1, index module 522-2, request module 522-3 or search module 522-4.

In some examples, logic flow 600 at block 602 may gather data for a database. The data may be associated with a heterogeneous data center having devices from multiple vendors. For these examples, gather module 522-1 may gather the data.

According to some examples, logic flow 600 at block 604 may index the database to link data for a first device from among the devices to an attribute of the first device, an association of the first device with another device from among the devices or a usage context for the first device. For these examples, index module 522-2 may index the database to link the data for the first device.

According to some examples, logic flow 600 at block 606 may receive a search request. For these examples, receive module 522-3 may receive the search request. In some examples, given the search request received, receive module 522-3 may be capable of analyzing similar, domain specific terminology that may apply in this context which may enhance the search criteria and provide more relevant results for the search requestor. The domain specific terminology applied to this context may be prioritized based on domain relevancy and returned to the search requestor.

In some examples, logic flow 500 at block 608 may provide, responsive to the search request, data for the first device from the database based on a comparison of the search request to the indexed database. For these examples, search module 522-4 may provide the data based on the comparison.

Figure 7:
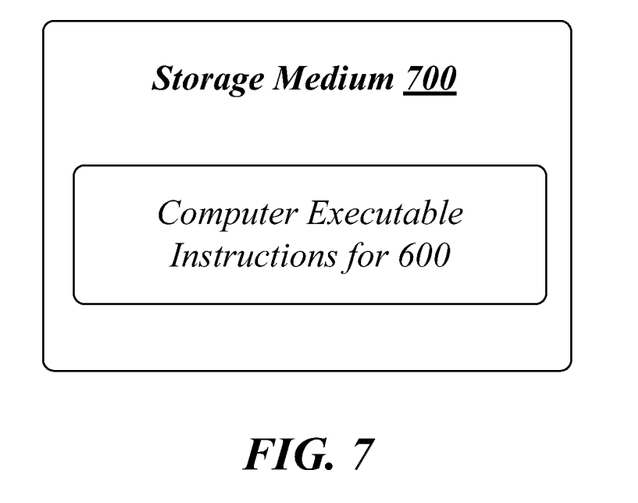
FIG. 7 illustrates an example storage medium.

FIG. 7 illustrates an embodiment of a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
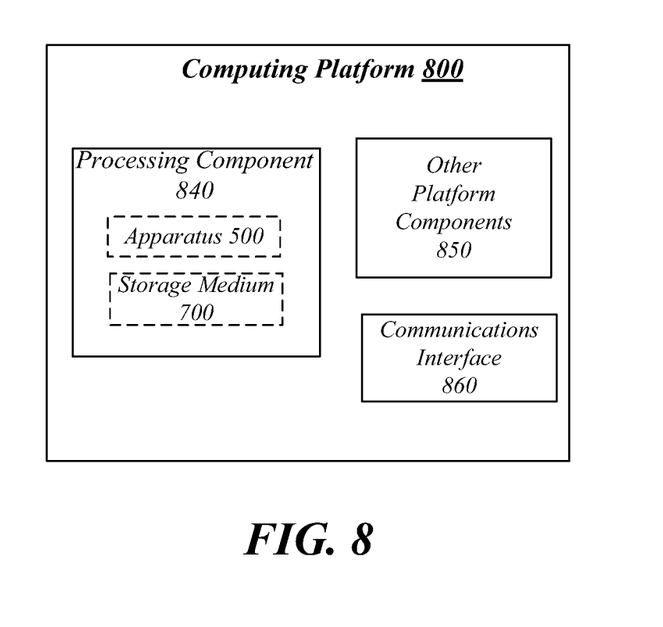
FIG. 8 illustrates an example computing platform.

FIG. 8 illustrates an example computing device 800. In some examples, as shown in FIG. 8, computing device 800 may include a processing component 840, other platform components 850 or a communications interface 860.

According to some examples, processing component 840 may execute processing operations or logic for apparatus 500 and/or computer readable medium 800. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units associated with either other platform components 850 may include without limitation, various types of computer readable and machine readable storage media in the form of one or more higher speed memory units, such as ROM, RAM, DRAM, Double-Data-Rate DRAM (DDRAM), synchronous DRAM (SDRAM), SRAM, programmable ROM (PROM), EPROM, EEPROM, NAND flash memory, NOR flash memory, polymer memory such as ferroelectric polymer memory, ferroelectric transistor random access memory (FeTRAM or FeRAM), nanowire, ovonic memory, ferroelectric memory, 3-dimentional cross-point memory, SONOS memory, magnetic or optical cards, an array of devices such as Redundant Array of Independent Disks (RAID) drives, solid state memory devices (e.g., USB memory), SSDs and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) to include the Peripheral Component Interconnect (PCI) Express Base Specification, revision 3.0, published in November 2010 ("PCI Express" or "PCIe"), the Universal Serial Bus Specification, revision 3.0, published in November 2008 ("USB"), the Serial ATA (SATA) Specification, revision 3.1, published in July 2001, Request for Comments (RFC) 3720, Internet Small Computer System Interface (iSCSI), published in April 2004 and/or the Serial Attached SCSI (SAS) Specification, revision 2.1, published in December 2010. Network communications may occur via use of various communication protocols and may operate in compliance with one or more promulgated standards or specifications for wired or wireless networks by the Institute of Electrical Engineers (IEEE). These standards are specifications may include, but are not limited to, IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, later versions of this standard ("IEEE 802.11") for wireless mediums or IEEE 802.3-2008, Carrier sense Multiple access with Collision Detection (CSMA/CD) Access Method and Physical Layer Specifications, Published in December 2008 (hereinafter "IEEE 802.3") for wired mediums, one or more protocols that may encapsulate Fibre Channel frames over Ethernet networks referred to as fiber channel over Ethernet (FCoE), compatible with the protocols described by the American National Standard of Accredited Standards Committee INCITS T11 Technical Committee, Fibre Channel Backbone-5 (FC-BB-5) Standard, Revision 2.0, published June 2009 and/or protocols associated with RFC 3530, Network File System (NFS), version 4 Protocol, published in April 2003.

Computing device 800 may be part of a system or device that may be, for example, user equipment, a computer, a personal computer (PC), a desktop computer, a laptop computer, a notebook computer, a netbook computer, a tablet computer, a tablet, a portable gaming console, a portable media player, a smart phone, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing device 800 described herein, may be included or omitted in various embodiments of computing device 800, as suitably desired.

The components and features of computing device 800 may be implemented using any combination of discrete circuitry, application specific integrated circuits (ASICs), logic gates and/or single chip architectures. Further, the features of computing device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for searching data associated with devices in a heterogeneous data center, comprising:
    gathering, by a processor circuit of a management server, data for a database, the data associated with a heterogeneous data center having devices from multiple vendors, each device operating in at least one usage context, wherein the usage context includes a storage context when any device operates for storing or retrieving data from a storage unit or a host context when any device operates for providing computing resources;
    gathering data for the database based on one or more of a geographical location of the heterogeneous data center, a network domain associated with the heterogeneous data center, usage-specific gathering criteria or a usage pattern associated with previous search requests;
    generating an index data structure, by the management server, wherein an entry in the index data structure comprises a first pointer into the database to data for a first device from among the devices, an attribute of the first device, an association of the first device with another device from among the devices, and a usage context for the first device;
    indexing the database to link data for the first device to another association of the first device with one or more virtual machines hosted by the first device, the search request to indicate at least one of the one or more virtual machines hosted by the first device;
    receiving a search request, at the management server;
    searching the index based on the search request; and
    providing, by the management server, responsive to the search request, data for the first device from the database using the first pointer into the database.

2. The method of claim 1, comprising the search request indicating the attribute of the first device, the attribute to include a name assigned to the first device, a network address assigned to the first device or a unique identifier assigned to the first device.

3. The method of claim 1, comprising the search request indicating the other device from among the devices.

4. The method of claim 3, comprising the first device and the other device arranged in the heterogeneous data center as same types of devices to include one of a storage device or a host device.

5. The method of claim 1, comprising receiving the search request during the usage context for the first device that includes a storage usage context or a host usage context.

6. The method of claim 1, comprising:
    indexing the database to link data for a second device from among the devices to the same usage context as linked to the first device, the second device from a different vendor;
    receiving the search request during the same usage context; and
    providing the data for the first device and data for the second device from the database based on the comparison of the search request to the indexed database.

7. The method of claim 1, comprising:
    gathering updated data for the database, the updated data associated with the heterogeneous data center; and
    updating the indexed database to include the updated data.

8. An apparatus for searching data associated with devices in a heterogeneous data center comprising:
   circuitry;
   a gather module for execution by the circuitry to gather data for a database, the data associated with a heterogeneous data center having devices from multiple vendors, each device operating in at least one usage context, wherein the usage context includes a storage context when any device operates for storing or retrieving data from a storage unit or a host context when any device operates for providing computing resources and wherein the gather module gathers data for the database based on one or more of a geographical location of the heterogeneous data center, a network domain associated with the heterogeneous data center, usage-specific gathering criteria or a usage pattern associated with previous search requests;
   an index module for execution by the circuitry to create an index data structure, wherein an entry in the index data structure comprises a first pointer into the database to data for a first device from among the devices, an attribute of the first device, an association of the first device with another device from among the devices, and a usage context for the first device;
   a request module for execution by the circuitry to receive a search request; and
   a search module for execution by the circuitry to search the index based on the search request and to provide data for the first device from the database using the first pointer into the database; wherein the usage context for the first device is the host usage context; the index module further indexes the database to link data for the first device to another association of the first device with one or more virtual machines hosted by the first device; the search request received by the request module indicates at least one of the one or more virtual machines; and the search module provides data for the first device from the database based on the indication of the at least one or more virtual machines.

9. The apparatus of claim 8, comprising:
   the index module to index the database to link data for a second device from among the devices to the usage context linked to the first device, the second device from a different vendor;
   the request module to receive the search request during the usage context; and
   the search module to provide the data for the first device and data for the second device from the database based on the comparison of the search request to the indexed database.

10. The apparatus of claim 8, comprising the search request to indicate the attribute of the first device, the attribute to include a name assigned to the first device, a network address assigned to the first device or a unique identifier assigned to the first device.

11. The apparatus of claim 8, comprising the receive module to receive the search request during the usage context for the first device that includes a storage usage context or a host usage context.

12. The apparatus of claim 8, wherein the search request indicates another other device from among the devices.

13. The apparatus of claim 8, wherein the first device and the other device arranged in the heterogeneous data center as same types of devices to include one of a storage device or a host device.

14. At least one non-transitory machine readable medium for searching data associated with devices in a heterogeneous data center, comprising a plurality of instructions that in response to being executed by a system cause the system to:
   gather data for a database, the data associated with a heterogeneous data center having devices from multiple vendors, each device operating in at least one usage context, wherein the usage context includes a storage context when any device operates for storing or retrieving data from a storage unit or a host context when any device operates for providing computing resources and wherein data gathered for the database is based on one or more of a geographical location of the heterogeneous data center, a network domain associated with the heterogeneous data center, usage-specific gathering criteria or a usage pattern associated with previous search requests;
   generate an_index data structure wherein an entry in the index data structure comprises a first pointer into the database to data for a first device from among the devices, an attribute of the first device, an association of the first device with another device from among the devices, and a usage context for the first device;
   update the index data structure wherein a second entry comprises a second pointer to data for a second device from among the devices and the usage context linked to the first device, the second device from a different vendor;
   receive a search request; and
   provide data from the database for the first device or for the second device responsive to the search request based on a comparison of the search request to the index data structure; wherein the usage context for the first device is the host usage context, and the database is indexed to link data for the first device to another association of the first device with one or more virtual machines hosted by the first device, the received search request to indicate at least one of the one or more virtual machines; and data for the first device is provided from the database based on the indication of the at least one or more virtual machines.

15. The at least one machine readable medium of claim 14, comprising the search request to indicate the attribute of the first device, the attribute to include a name assigned to the first device, a network address assigned to the first device or a unique identifier assigned to the first device.

16. The at least one machine readable medium of claim 14, comprising to receive the search request during the usage context for the first device that includes a storage usage context or a host usage context.

17. The at least one machine readable medium of claim 14, wherein the instructions to further causes the system to:
   index the database to link data for a second device from among the devices to the same usage context as linked to the first device, the second device from a different vendor;
   receive the search request during the same usage context; and
   provide the data for the first device and data for the second device from the database based on the comparison of the search request to the indexed database.

18. The at least one machine readable medium of claim 14, wherein the instructions to further causes the system to:
   gather updated data for the database, the updated data associated with the heterogeneous data center; and
   update the indexed database to include the updated data.

19. The at least one machine readable medium of claim 14, wherein the search request indicates another other device from among the devices.

20. The at least one machine readable medium of claim 14, wherein the first device and the other device arranged in the heterogeneous data center as same types of devices to include one of a storage device or a host device.

* * * * *